Aug. 26, 1969  E. FROELICH  3,463,544
ORTHOPEDIC SEAT BACK
Filed April 22, 1968  2 Sheets-Sheet 2
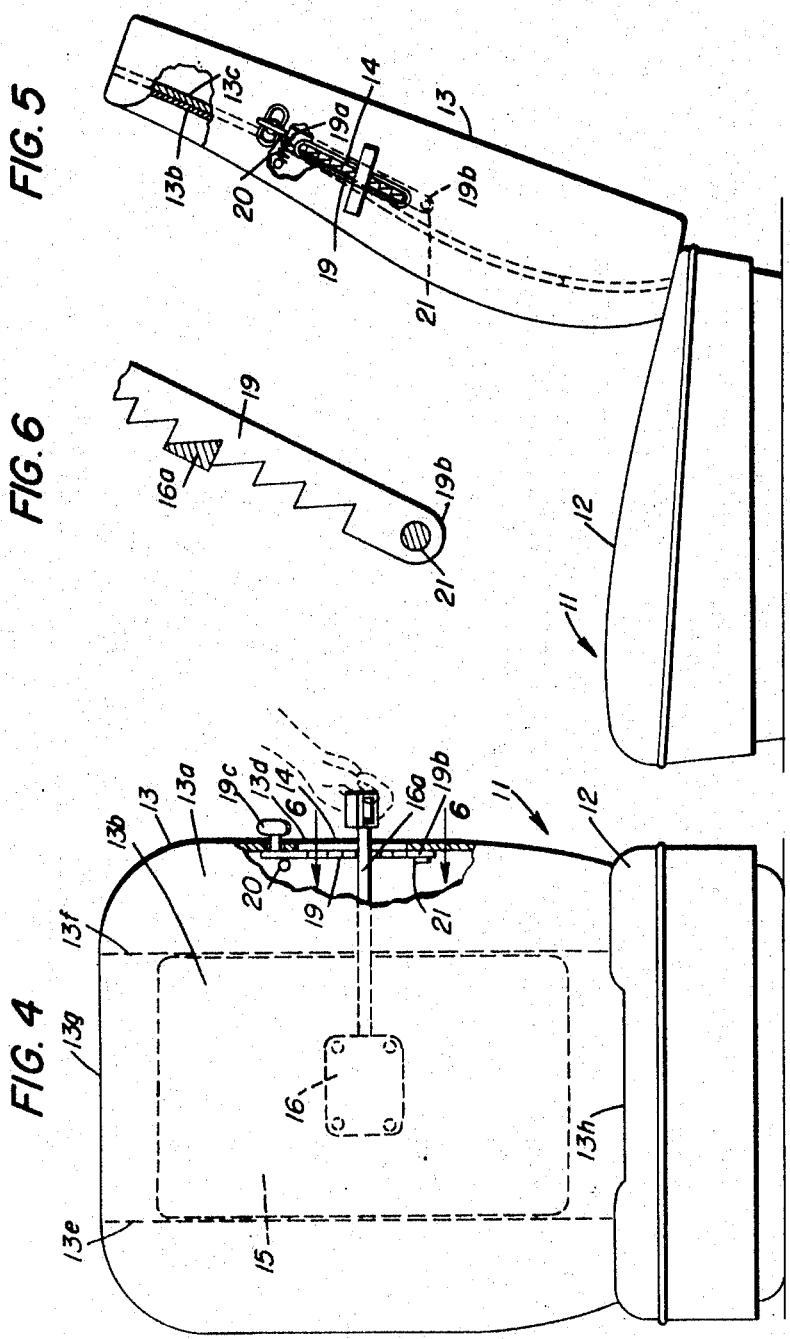
INVENTOR.
Edward Froelich
BY John Howard Sargent
HIS ATTORNEY

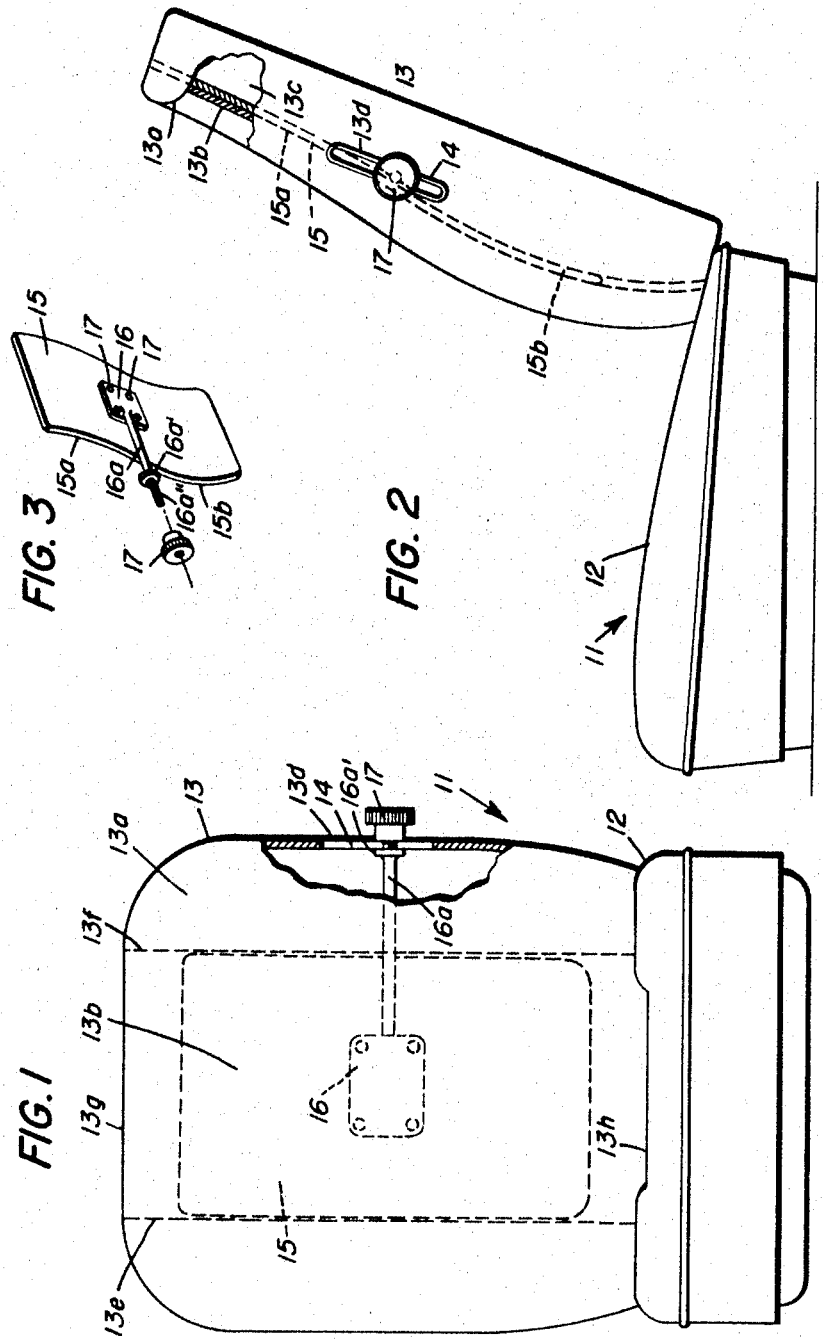

United States Patent Office 3,463,544
Patented Aug. 26, 1969

3,463,544
ORTHOPEDIC SEAT BACK
Edward Froelich, 5408 Eastview Park,
Chicago, Ill. 60615
Filed Apr. 22, 1968, Ser. No. 723,217
Int. Cl. A47c 7/46
U.S. Cl. 297—284                   5 Claims

ABSTRACT OF THE DISCLOSURE

An orthopedic back rest for chairs, automobile seats, and the like, including an exterior portion with slotted opening along one side thereof and a portion interiorly of the front surface of the exterior portion, with longitudinally extending means securing the two together in such manner as to define a limiting edge therebetween, and a rigid and contoured orthopedic device disposed in vertical adjustable manner between the exterior and interior portions and against the limiting edge, with an arm secured to the orthopedic device and protruding laterally through the slotted opening in the side of the seat back, and a lock or latch for securing the arm to the seat back to maintain the orthopedic device in a selected vertical position suited to the individual user of the seat.

---

In introduction, the present application for patent is directed to an improvement over the orthopedic seat support described in my prior U.S. Patent 3,321,241 of May 23, 1967. The invention more particularly concerns the provision of such seats with included back and back rest which back rest is closely and readily adjustable in conformity to the orthopedic requirements of the particular user of the seat.

One of the objects of my invention is to provide a seat back with related orthopedic back rest, which back rest is particularly limited to adjustment along a vertical or longitudinal axis of the back with effective restraint against lateral movement.

A further object is to provide a seat back of the character indicated in which provision is made for effective adjustment in simple and reliable manner to conform closely to the support requirements of the individual user, and wherein adjustment readily is made through simple control and rapid and effective lock in desired position is achieved.

Other objects of my invention in part will be obvious and in part pointed out hereinafter during the course of the following description, when considered in the light of the accompanying drawings.

My invention, therefore, may be considered as residing in the combination of elements and arrangement of parts, and in the relation between each of the same with one or more of the others, all as described herein, the scope of the application of which is set out in the claims at the end of this specification.

BACKGROUND OF THE INVENTION

In order to gain a more ready understanding of certain features of my invention, it may be noted at this point that it long has been recognized that prolonged sitting in an automobile, or in a chair or on a sofa, frequently is attended by discomfort, particularly in the region of the back of the user. Rapid tiring especially is encountered in moving vehicles, such as automobiles, buses, trucks, and the like. While the particular region of back discomfort varies from person to person, further variation is introduced because of the configuration, construction and upholstery of the seat and back involved. The discomfort may develop especially in the thoracic region of one user, in the lumbar region of another, and in the sacral region of a further person.

While over the years many efforts have been made to effectively solve the problem noted, none seems to have been completely successful. In some of the requisite adjustability is lacking, the seat being suited to one user but not another. Other proposals have been either too complicated, too fragile, too uncertain, too expensive, or any combination of one or more of these. Still others require highly special shaping and construction of the seat back while failing to assure a combination of adjustability and reliability in the particular position of adjustment.

As a consequence, for one reason or another none of the available proposals has proved to be entirely satisfactory.

SUMMARY OF THE INVENTION

My invention in general may be considered as comprising a back for automobile seat, chair, bench, or the like with a rigid and contoured orthopedic back support element with suitable means for adjusting the same to desired position for the particular user, and reliably maintaining the same in the desired adjusted position, with simple and effective means for changing the position of the orthopedic back support element to suit another user of the seat, chair, bench, or the like.

Consequently, an object of my invention is to provide a simple, effective and reliable seat back with orthopedic back rest, especially for an automobile seat, a stenographic chair seat, or the like, which not only is pleasing in appearance, but which is comparatively inexpensive and assures ready and nice adjustment in direct and effective manner to the back support requirements of the particular user, providing support through protracted periods of use where frequent and varied movement of the user is required, as in driving an automobile or moving about in a stenographic chair, or the like.

BRIEF DESCRIPTION OF THE DRAWINGS

In the accompanying drawings wherein there is illustrated a seat and back according to my invention:

FIG. 1 shows in front elevation a seat in which certain parts are broken away to better disclose others, FIG. 2 discloses in side elevation the seat of FIG. 1 wherein certain parts also are broken away, FIG. 3 discloses in detail and reduced size the rigid orthopedic back support and adjustment arm employed in the seats of FIGS. 1 and 2

FIG. 4 discloses in front elevation the seat with back according to an alternate embodiment of my invention, with certain parts broken away to better disclose others, FIG. 5 discloses a side elevation of the seat of FIG. 4 with certain parts broken away, and FIG. 6 discloses in enlarged detail the ratchet control adjustment mechanism of the seat of FIGS. 4 and 5.

Like reference characters denote like parts throughout the several views of the drawings.

DESCRIPTION OF THE PREFERRED EMBODIMENTS

Referring now more particularly to the practice of my invention, and directing attention to the several views of the drawings, I provide (see FIGS. 1 and 2) illustratively a bucket seat or bench seat, or split bench seat of the general type employed in many of the automobiles in current use. The seat 11 comprises a cushion 12 and back 13 suitably adjusted in angular relation by means not shown. The back generally consists of an exterior portion with padded cover 13a conventionally provided with depressed mid-portion 13b and interior portion 13c. One side of the back is slotted as at 13d to form a window which accommodates a frame 14 conveniently fashioned of metal. The front portion of seat back 13, for a best combination of results, is provided with parallel rows of stitching 13e and 13f which are spaced apart and extend transversely from the top of the seat back to the bottom of the same, that is, from 13g to 13h. The stitching sews together the front padded portion 13b of the seat back and an interior portion 13c. It will be seen that the spaced parallel rows of stitching form a pocket between 13b and 13c of a width defined by the distance between 13e and 13f. Conveniently the pocket extends from the bottom 13h of the seat back to the top 13g.

Located within the pocket I provide a rigid and contoured orthopedic device 15 (see also FIG. 3). This device it will be seen is of a generally concave-convex construction, the general concavity 15a being provided in the upper portion, with a generally convex form being provided in the lower portion. The orthopedic device is so contoured as to generally adapt to the shape of the human back.

Orthopedic device 15 is well adapted to be adjusted upwardly and downwardly in the pocket formed between spaced parallel rows of stitching 13e and 13f and the front portion 13b and interior portion 13c of back 13. And in that regard I provide plate 16 suitably fastened to the contoured orthopedic device by way of rivets or bolts 17 (see FIG. 3). Plate 16 conveniently is provided with a laterally extending arm 16a with swollen portion 16a' and threaded portion 16a". The length and placement of arm 16a are such that threaded portion 16a" neatly fits and extends through frame 14 of the slotted window 13d provided in the side of seat back 13. The construction is such that swollen portion 16a' rides against the inner surface of frame 14. The precise positioning of the contoured orthopedic back or device is had by raising or lowering the same by way of arm 16a and securing in position by way of locknut 17 engaging the threaded portion 16a" of the arm and firmly gripping against window frame 14.

Adjustment to suit another user of the seat is had by merely backing off nut 17 and raising or lowering the arm, as the case may be, to desired position, and tightening the same as before to maintain the orthopedic device in the desired location.

While a best combination of results is had by employing the spaced parallel rows of stitching 13e and 13f as described above, many of the desired features of control may nevertheless be achieved even where one of the rows of stitching is omitted, the remaining row and the window frame provided in the side of the seat then serving as the guide for upward and downward travel of rigid and contoured orthopedic device 15. But best control, with ease of adjustment and precision of location and maintaining the device in desired position, are had where it is the two spaced parallel rows which are provided for guidance.

As an alternate embodiment of my invention, I provide ratchet means to adjust and maintain the rigid and contoured device in desired position. In that regard seat 11 with cushion 12 and back 13 (see FIGS. 4 and 5), with spaced parallel rows of stitching 13e and 13f forming a pocket between the front portion 13b and interior portion 13c of back 13, this conveniently extending from top 13g to bottom 13h of the back, accommodates the rigid and contoured orthopedic device 15 as in the construction described above. Plate 16, as in the construction described above, is riveted, bolted or otherwise secured to orthopedic device 15, the plate conveniently being secured to the laterally extending arm 16a protruding through window frame 14, this framing a slotted opening 13d in the side of the back 13.

Orthopedic device 15 is adjusted upwardly or downwardly, as desired to suit a particular user of the seat, by way of arm 16a. This is lifted or lowered by hand, as generally indicated in FIG. 4 of the drawings. In lifting orthopedic back 15, arm 16a acts against ratchet 19, which is urged against rod 16a by spring 20 suitably anchored to seat back 13 and secured to ratchet 19 as at upper position 19a (see FIG. 5). Ratchet 19 conveniently is pivotally supported at its lower end 19b by way of stud 21 inwardly projecting from the frame of back 13. As a further convenience, ratchet arm 19 is provided with handle 19c for releasing the action of the ratchet and permitting a ready lowering of orthopedic back 15 by way of arm 16a and subsequent re-engagement of ratchet and arm 16a in the desired position of the orthopedic back device.

In the alternate embodiment of my invention the spaced parallel rows of stitching 13e and 13f serve as a guide for the rigid orthopedic back device 15 in its upward or downward position, although where desired, arm 16a might well be provided with suitably spaced swollen portions, one near and one far, engaging about ratchet arm 19 which would permit elimination of one row of stitching. But, here again, a best combination of ease of adjustment and firm maintenance in adjusted position are had where there is provided the pocket or track of the two spaced parallel rows.

In conclusion, it will be seen that I provide in my invention a construction for the back of an automobile seat, a chair, a bench, or the like, wherein firm and contoured support is had for the user, which support is readily adjusted in simple, effective manner and yet with desired nicety and with reliability in adjusted position. In my new seat back there are had the many advantages hereinbefore set forth, together with long, useful life.

Inasmuch as many embodiments may be made of my invention, and inasmuch as various changes may be made in the embodiments described above, it is to be understood that all matter described herein and/or shown in the accompanying drawings, is to be taken as illustrative and not by way of limitation.

I claim as my invention:

1. A seat back comprising an exterior portion with slotted opening along a side portion of the back; a portion interiorly of the front surface of said exterior portion; longitudinally extending means securing together said exterior and interior portions in such manner as to define a limiting edge therebetween; a rigid and contoured orthopedic device disposed in vertical adjustable manner between said exterior and interior portions and against said limiting edge; arm means secured to said orthopedic device and protruding laterally through the slotted opening in the side of said exterior portion; means spaced from said limiting edge to present lateral movement of said orthopedic device; and means for fastening said arm means to said seat back to maintain said orthopedic device in selected vertical position.

2. A seat back comprising an exterior portion with slotted opening along a side portion of the back; frame means secured to said exterior portion and framing the said slotted opening; a portion interiorly of the front face of said exterior portion; longitudinally extending spaced parallel rows of stitching securing said interior portion and said exterior portion and providing a pocket therebetween; a rigid and contoured orthopedic device disposed in vertical adjustment within said pocket; arm means secured to said orthopedic device and protruding laterally through the slotted opening of said exterior portion; and lock means cooperating with the arm means and said frame to maintain said orthopedic device in selected vertical position.

3. A seat back comprising an exterior portion with slotted opening along a side portion of the back and means secured to said exterior portion and framing the said slotted opening; a portion interiorly of the front face of said exterior portion; longitudinally extending spaced parallel means securing together said exterior and interior portions in such manner as to define a pocket therebetween; a rigid and contoured orthopedic device disposed in vertical adjustment within said pocket; arm means having one end secured to said orthopedic device with the other end protruding laterally through the slotted opening of said exterior portion, said protruding end being provided with a swollen abutting portion and a threaded portion therebeyond; and threaded means cooperating with the threaded portion of said orthopedic device for locking said swollen abutting portion against said frame means to maintain said orthopedic device in selected vertical position.

4. A seat back comprising an exterior portion with slotted opening along a side portion of the back; a portion interiorly of the front face of said exterior portion; longitudinally extending spaced parallel rows of stitching securing said interior portion and said exterior portion and providing a pocket therebetween; a rigid and contoured orthopedic device disposed in vertical adjustment within said pocket; arm means secured to said orthopedic device and protruding laterally through the slotted opening of said exterior portion; and ratchet means secured to said back and engaging said arm means to maintain said orthopedic device in selected vertical position.

5. A seat back comprising an exterior portion with slotted opening along a side portion of the back; ratchet means secured to said back adjacent said slotted opening; a portion interiorly of the front face of said exterior portion; spaced parallel longitudinally extending means securing together said exterior and interior portions in such manner as to define a pocket therebetween; a rigid and contoured orthopedic device disposed in vertical adjustment within said pocket; and arm means secured to said orthopedic device and protruding laterally through the slotted opening of said exterior portion, said arm means being provided with handle and portion engaging the said ratchet means to maintain said orthopedic device in selected vertical position.

References Cited
UNITED STATES PATENTS

| | | | |
|---|---|---|---|
| 1,205,802 | 11/1916 | Silbert | 297—284 |
| 1,264,265 | 4/1918 | Brusius | 297—284 |
| 1,789,821 | 1/1931 | Leffingwell | 297—284 |
| 2,756,809 | 7/1956 | Endresen | 297—284 |
| 3,321,241 | 5/1967 | Froelich | 297—284 |
| 3,378,299 | 4/1968 | Sandon | 297—284 |

BOBBY R. GAY, Primary Examiner

GLENN O. FINCH, Assistant Examiner